(12) United States Patent
Blaskett et al.

(10) Patent No.: US 10,364,362 B2
(45) Date of Patent: Jul. 30, 2019

(54) INKS

(71) Applicant: Sericol Limited, Broadstairs (GB)

(72) Inventors: Bridgette Blaskett, Broadstairs (GB); Carole Noutary, Broadstairs (GB); Sean Slater, Broadstairs (GB)

(73) Assignee: Sericol Limited, Broadstairs (GB)

( * ) Notice: Subject to any disclaimer, the term of this patent is extended or adjusted under 35 U.S.C. 154(b) by 62 days.

(21) Appl. No.: 15/310,199

(22) PCT Filed: May 11, 2015

(86) PCT No.: PCT/GB2015/051381
§ 371 (c)(1),
(2) Date: Nov. 10, 2016

(87) PCT Pub. No.: WO2015/173552
PCT Pub. Date: Nov. 19, 2015

(65) Prior Publication Data
US 2017/0145231 A1   May 25, 2017

(30) Foreign Application Priority Data
May 13, 2014   (GB) .................................. 1408467.7

(51) Int. Cl.
*B41J 2/01*   (2006.01)
*C09D 11/101*   (2014.01)
*C09D 11/322*   (2014.01)
*C09D 11/324*   (2014.01)

(52) U.S. Cl.
CPC .............. *C09D 11/101* (2013.01); *B41J 2/01* (2013.01); *C09D 11/322* (2013.01); *C09D 11/324* (2013.01)

(58) Field of Classification Search
None
See application file for complete search history.

(56) References Cited

U.S. PATENT DOCUMENTS

| | | | |
|---|---|---|---|
| 8,752,950 B2 | 6/2014 | Hayata | |
| 8,807,728 B2 | 8/2014 | Hayata | |
| 8,991,991 B2 | 3/2015 | Hoogmartens | |
| 8,998,398 B2 | 4/2015 | Hoogmartens | |
| 9,010,914 B2 | 4/2015 | Hayata | |
| 9,428,665 B2 | 8/2016 | Hiraoka | |
| 2004/0006157 A1 | 1/2004 | Gloster et al. | |
| 2007/0042162 A1 | 2/2007 | Selman et al. | |
| 2008/0090931 A1 | 4/2008 | Nagvekar et al. | |
| 2009/0124720 A1 | 5/2009 | Tsuchiya et al. | |
| 2009/0305005 A1 | 12/2009 | Ward et al. | |
| 2011/0223391 A1 | 9/2011 | Nishimura et al. | |
| 2012/0026235 A1 | 2/2012 | Hayata | |
| 2012/0069082 A1 | 3/2012 | Hayata | |
| 2012/0077896 A1 | 3/2012 | Ishima | |
| 2013/0016166 A1 | 1/2013 | Hayata | |
| 2013/0050367 A1 | 2/2013 | Hoogmartens | |
| 2013/0230701 A1 | 9/2013 | Mochizuki | |
| 2014/0015906 A1 | 1/2014 | Nakamura et al. | |
| 2014/0093709 A1 | 4/2014 | Toyoda et al. | |
| 2015/0361284 A1* | 12/2015 | Herlihy | C08K 3/01 522/18 |
| 2016/0068695 A1* | 3/2016 | Suzuki | C09D 11/30 347/102 |
| 2016/0340529 A1* | 11/2016 | Lawrence | C09D 11/30 |
| 2017/0009091 A1* | 1/2017 | Herlihy | C09D 11/30 |

FOREIGN PATENT DOCUMENTS

| | | |
|---|---|---|
| EP | 1477536 A1 | 11/2004 |
| EP | 2399965 A1 | 12/2011 |
| EP | 2412768 A2 | 2/2012 |
| EP | 2439244 A1 | 4/2012 |
| EP | 2546313 A1 | 1/2013 |
| EP | 2617782 A1 | 7/2013 |
| EP | 2738226 A1 | 6/2014 |
| JP | 2008019331 A | 1/2008 |

OTHER PUBLICATIONS

International Search Report issued from corresponding PCT/GB2015/051381, dated Jul. 23, 2015.

* cited by examiner

*Primary Examiner* — Erica S Lin
(74) *Attorney, Agent, or Firm* — Banner & Witcoff, Ltd.

(57) ABSTRACT

A radiation-curable ink comprising (i) a colorant; (ii) a cyclohexyl acrylate of the Formula (1) wherein each R independently is C1-4-alkyl; n has a value of 1, 2 or 3; and Q is H or CH3; (iii) a monoacrylate which comprises a cyclohexyl and/or cyclopentyl ring; and (iv) 0 to 5 wt % of N-vinyl caprolactam; and (v) cyclic trimethylolpropane formal acrylate.

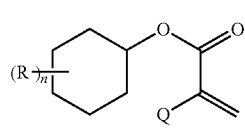

(1)

21 Claims, No Drawings

INKS

RELATED APPLICATIONS

This application is a National Stage Application under 35 U.S.C. 371 of co-pending PCT application PCT/GB2015/051381 designating the United States and filed May 11, 2015; which claims the benefit of GB application number 1408467.7 and filed May 13, 2014 each of which are hereby incorporated by reference in their entireties.

This invention relates to radiation-curable inks and to their use in ink jet printing.

Ink jet printing is a commonly used technique for printing substrates. The inks used vary depending on the properties required for the printed substrate. Water-based, solvent-based and radiation-curable ink jet printing inks are commercially available.

Radiation-curable ink jet printing inks are known and typically comprises a colorant and monomers which solidify when exposed to radiation, e.g. UV light. Many commercially available radiation-curable inks contain significant amounts of n-vinyl caprolactam. For example, European Patent Application No. 2,412,768 describes inks containing n-vinyl caprolactam (NVC).

The European Printing Ink Association (EuPIA) maintains a list of chemicals which it recommends is avoided in inks, called the EuPIA exclusion list. Recently (2014) the classification of NVC was changed such that it met the criteria for exclusion list. Consequently there is a strong driver to reduce the amount of NVC inks and preferably to avoid NVC altogether if possible.

Designing inks which contain little or no NVC which provide prints having desirable properties is no easy matter. For example, WO 2005/026270, pages 9 and 10, show that omission of NVC from inks can result in inks which adhere poorly to substrates. There is a need for ink compositions which contain little or no NVC which overcome some or all of the aforementioned deficiencies.

According to the present invention there is provided a radiation-curable ink comprising:
(i) a colorant;
(ii) a cyclohexyl (meth)acrylate of the Formula (1):

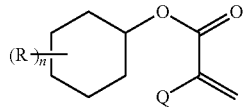

Formula (1)

wherein:
each R independently is $C_{1-4}$-alkyl;
n has a value of 1, 2 or 3; and
Q is H or $CH_3$;
(iii) an mono(meth)acrylate which comprises a cyclohexyl and/or cyclopentyl group;
(iv) 0 to 5 wt % of N-vinyl caprolactam; and
(v) cyclic trimethylolpropane formal acrylate.

In this specification (including its claims), the verb "comprise" and its conjugations is used in its non-limiting sense to mean that items following the word are included, but items not specifically mentioned are not excluded. In addition, reference to a feature by the indefinite article "a" or "an" does not exclude the possibility that more than one of the elements is present, unless the context clearly requires that there be one and only one of the elements. For example "having one" means having one and only one (not including two or more). The indefinite article "a" or "an" thus usually means "at least one". Moreover, in the present invention '(meth)acrylate' means both 'acrylate' and 'methacrylate'.

The colorant is preferably an oil-soluble dye or, more preferably, a pigment.

The pigment which can be used as colorant is not particularly limited, for example it can be an organic or inorganic pigment or a mixture thereof. Numerous commercially available pigments are listed in the Colour Index International.

Examples of red or magenta pigments include C.I. Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226 and 257; C.I. Pigment Violet 3, 19, 23, 29, 30, 37, 50 and 88; and C.I. Pigment Orange 13, 16, 20 and 36.

Examples of blue or cyan pigments include C.I. Pigment Blue 1, 15, 15:1, 15:2, 15:3, 15:4, 15:6, 16, 17:1, 22, 27, 28, 29, 36 and 60.

Examples of green pigments include C.I. Pigment Green 7, 26, 36 and 50.

Examples of yellow pigments include C.I. Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185 and 193.

Examples of black pigments include carbon blacks and C.I. Pigment Black 7, 28 and 26.

Examples of white pigments include titanium dioxide and C.I. Pigment White 6, 18 and 21.

The oil-soluble dye is preferably substantially insoluble in water (e.g. a water-solubility of below 1 wt % at 25° C.) and soluble in the remaining components of the ink (solubility above 1 wt % at 25° C.).

Examples of preferred oil-soluble dyes include:
the C.I. solvent dyes mentioned below:
C.I. Solvent: Black 3, 7, 27, 29 and 34; Yellow 14, 16, 19, 29, 30, 56, 82, 93 and 162; Red 1, 3, 8, 18, 24, 27, 43, 49, 51, 72, 73, 109, 122, 132 and 218; Violet 3; Blue 2, 11, 25, 35, 38, 67 and 70; Green 3 and 7; and Orange 2; and
the C.I disperse dyes mentioned below:
C.I. Disperse: Yellow 5, 42, 54, 64, 79, 82, 83, 93, 99, 100, 119, 122, 124, 126, 160, 184:1, 186, 198, 199, 201, 204, 224 and 237; Orange 13, 29, 31:1, 33, 49, 54, 55, 66, 73, 118, 119 and 163; Red 54, 60, 72, 73, 86, 88, 91, 92, 93, 11.1, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; Violet 33; Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and Green 6:1 and 9.

One will usually select a colorant which will not absorb all of the curing radiation.

Typically the colorant is dispersed with the other ingredients of the ink using a dispersing device, for example, a ball mill, a sand mill, an attritor, a roll mill, an agitator, a Henschel mixer, a colloid mill, an ultrasonic homogenizer, a pearl mill, a wet type jet mill, a paint shaker or the like.

It is also possible to include a dispersant in the ink, especially when the colorant comprises a pigment. Although the type of dispersant is not particularly limited, it is preferred to use a high-molecular weight dispersant. Examples of the high-molecular weight dispersant include the Solsperse™ hyperdispersants. It is also possible to use a synergist with the dispersant. In the present invention, the dispersant (when included) is preferably added in an amount of from 1 to 50 parts by weight per 100 parts by weight of colorant.

The colorant may be a single component or a combination of two or more components (e.g. 2 or more pigments, a dye and a pigment in combination and so forth).

When the colorant comprises a pigment it preferably has an average particle size below 0.5 µm, more preferably below 0.3 µm. This is for storage stability advantages, and also because larger particles could block the fine nozzles of an ink jet printer if the ink is used in such a printer.

The amount of colorant present in the ink is preferably 0.1 to 20 wt %, more preferably 0.5 to 15 wt %, especially 0.75 to 7 wt %, relative to the total weight of the ink.

When calculating the number of parts of the colorant, the weight of any additional ingredients (e.g. dispersant, diluent, monomers, liquid vehicle etc.) are not included.

Typically the colorant is in the form of a mixture with one or more of the other ink components when the ink is made. For example, a composition comprising the colorant and dipropylene glycol diacrylate ("DPGDA"), neopentylglycol [2 PO] diacrylate ("NPGPODA"), triethylene glycol divinyl ether ("DVE-3") or most preferably 2-phenoxyethyl acrylate ("PEA") is typically mixed with the other ingredients in order to provide the desired ink.

In Formula (1) shown above, Q is preferably H.

Examples of groups represented by R include methyl, ethyl, propyl and butyl.

When n has a value of 2 or 3, the groups represented by R may all be the same or they may be different.

Preferably n and R are chosen such that the total number of carbon atoms in the R groups attached to the cyclohexyl ring shown in Formula (1) is 2, 3 or 4. Therefore when n has a value of 1, R is preferably ethyl, propyl or butyl, especially butyl. When n has a value of 2 or 3, R is preferably methyl.

Preferred propyl groups are n-propyl and iso-propyl.

Preferred butyl groups are n-butyl, sec-butyl and tert butyl.

Especially preferred cyclohexyl (meth)acrylates of the Formula (1) include t-butylcyclohexyl acrylate (particularly 4-(t-butyl)cycolexyl acrylate (TBCHA)), trimethyl cyclohexyl acrylate (particularly 2,4,6-trimethyl cyclohexyl acrylate (TMCHA)) and mixtures thereof.

TBCHA has the following structure:

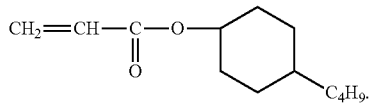

TMCHA has the following structure:

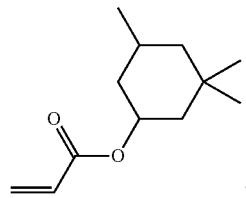

The amount of component (ii) present in the ink is preferably 5 to 40 wt %, more preferably 8 to 35 wt %, especially 10 to 30 wt %, relative to the total weight of the ink.

Components (ii) and (iii) are not the same. Preferably component (iii) is not of Formula (1) as hereinbefore defined.

Component (iii) optionally comprises a cyclohexyl group and is free from cyclopentyl groups, or comprises a cyclopentyl group and is free from cyclohexyl groups, or comprises a cyclohexyl group and a cycolpentyl group. Optionally component (iii) comprises a cyclohexyl group and a cycolpentyl group which comprise 2 or 3 of the same carbon atoms, e.g. as in isobornyl (meth)acrylate.

Preferably Component (iii) comprises at least two (especially two and only two) mono(meth)acrylates which each independently comprises a cyclohexyl and/or cyclopentyl group.

Examples of component (iii) include isobornyl acrylate ("IBOA") and dihydrodicyclopentadienyl acrylate ("DCPA") and especially mixtures comprising two or more thereof due to the particularly good cure, scratch resistance and low film tack of resultant prints.

Component (iii) preferably has a Tg of >50° C., more preferably >80° C. The amount of component (iii) present in the ink is preferably 5 to 40 wt %, more preferably 8 to 35 wt %, especially 10 to 30 wt %, relative to the total weight of the ink.

IBOA has the following structure:

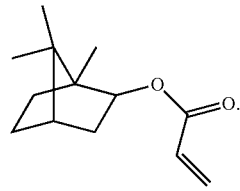

DCPA has the structure:

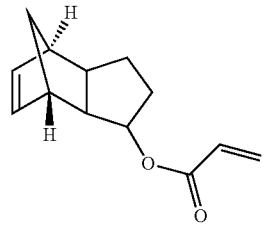

Preferably the radiation-curable ink contains less than 1 wt % of NVC, more preferably the radiation-curable ink is free from N-vinyl caprolactam (NVC), i.e. contains 0 wt % NVC.

The radiation-curable ink comprises (v) cyclic trimethylolpropane formal acrylate (CTFA). The amount of CTFA in the ink is preferably 5 to 40 wt %, more preferably 5 to 35 wt %, especially 8 to 35 wt % and more especially 10 to 30 wt %, relative to the total weight of the ink. CTFA has the following structure:

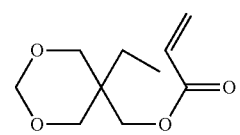

In one embodiment the ink comprises at least 10 wt % of component (ii) and at least 10 wt % of component (iii).

In one embodiment the ink comprises at least 10 wt % of each of components (ii), (iii) and (v).

In another embodiment the ink comprises at least 10 wt % of each of components (ii), (iii), (v) and (ix).

Preferably the radiation-curable ink further comprises (vi) a compound having a number average molecular weight ("NAMW") of up to 1000 and more than one ethylenically unsaturated group.

Preferred ethylenically unsaturated groups are vinyl groups, (meth)acrylic groups, especially (meth)acrylate and (meth)acrylamide groups. Examples of ethylenically unsaturated groups include acrylamide ($H_2C$=CHCON<) groups, methacrylamide ($H_2C$=C($CH_3$)CON<) groups, acrylate $H_2C$=CHCO$_2$ groups and methacrylate ($H_2C$=C($CH_3$)CO$_2$—) groups.

As examples of compounds having a NAMW of up to 1000 and more than one ethylenically unsaturated group there may be mentioned ethylene glycol di(meth)acrylate, dicyclopentenyl di(meth)acrylate, decanediol diacrylate, triethylene glycol diacrylate tetraethylene glycol di(meth)acrylate, tricyclodecanediyldimethylene di(meth)acrylate, di(meth)acrylate, trimethylolpropane tri(meth)acrylate, EO-modified trimethylolpropane tri(meth)acrylate, PO-modified trimethylolpropane tri(meth)acrylate, tripropylene glycol di(meth)acrylate, neopentyl glycol di(meth)acrylate, 1,4-butanediol di(meth)acrylate, 1,6-hexanediol di(meth)acrylate, pentaerythritol tri(meth)acrylate, pentaerythritol tetra(meth)acrylate, polyethylene glycol di(meth)acrylate, dipentaerythritol penta(meth)acrylate, dipentaerythritol tetra(meth)acrylate, ditrimethylolpropane tetra(meth)acrylate. Commercially available compounds having more than one ethylenically unsaturated group include: SR 295 (pentaerythritol tetracrylate); SR 350 (trimethylolpropane trimethacrylate); SR 351 (trimethylolpropane triacrylate); SR 367 (tetramethylolmethane tetramethacrylate); SR 368 (tris(2-acryloxy ethyl) isocyanurate triacrylate); SR 399 (dipentaerythritol pentaacrylate); SR 444 (pentaerythritol triacrylate); SR 454 (ethoxylated (3) trimethylolpropane triacrylate); SR 833S (tricyclodecane dimethanol diacrylate) and SR 9041 (dipentaerythritol pentaacrylate ester), available from Sartomer Co Inc.

The amount of component (vi) present in the ink is preferably 0 to 5 wt %, more preferably 0 to 4 wt %, especially 0.1 to 3.5 wt %, more especially 0.2 to 2 wt %, relative to the total weight of the ink.

The radiation-curable ink optionally further comprises (vii) a (meth)acrylate oligomer having a NAMW above 1000. The (meth)acrylate oligomer having a NAMW above 1000 is preferably a urethane (meth)acrylate oligomer or a polyester (meth)acrylate oligomer, especially an aliphatic urethane (meth)acrylate oligomer, in each case having a NAMW above 1000.

Examples of commercially available aliphatic urethane (meth)acrylate oligomers having a NAMW above 1000 include: CN 934 CN 934X50, CN 944B85, CN 945A60, CN 945B85, CN 953B70, CN 961 E75, CN 961 H81, CN 962, CN 963A80, CN 963B80, CN 963E75, CN 963E80, CN 963J85, CN 964, CN 964A85, CN 964B85, CN 964H90, CN 964E75, CN 965, CN 965A80, CN 966A80, CN 966B85, CN 966H90, CN 966180, CN 966J75, CN 966R60, CN9012, PRO20169, CN 968, CN 982E75, CN 982P90, CN 983, CN 983B88, CN 984 and CN 985B88, all available from Sartomer, Genomer 5695 available from Rahn and mixtures comprising two or more thereof.

Examples of commercially available aromatic urethane (meth)acrylate oligomers having a NAMW above 1000 include CN 970A60, CN 970E60, CN 970H75, CN 971 A80, CN 972, CN 973A80, CN 973H85, CN 973J75, CN 975, CN 977C70, CN 978, CN 980, CN 980M50, CN 981, CN 981 A75, CN 981 B88, CN 982A75 and CN 982B88, all from Sartomer, and mixtures comprising two or more thereof.

Examples of commercially available polyester (meth)acrylate oligomers having a NAMW above 1000 include CN2560, CN2555 and CN2505 (all available from Sartomer) and mixtures comprising two or more thereof.

The amount of (meth)acrylate oligomer having a NAMW above 1000 (component (vii)) present in the ink the amount is preferably 0 to 10 wt %, especially 0.25 to 6 wt %, more especially 1 to 5 wt %, relative to the total weight of the ink.

Preferably the radiation-curable ink further comprises (viii) a polymerization initiator. Preferred polymerization initiators include [alpha]-amino ketone compounds, [alpha]-hydroxy ketone compounds, thioxanthone compounds and bisacylphosphine oxide compounds.

Furthermore, from the viewpoint of surface cure versus through cure, it is preferable for the ink composition of the present invention to comprise at least two types of polymerization initiators, e.g. selected from the group consisting of a bisacylphosphine oxide compound, an [alpha]-amino ketone compound, and a thioxanthone compound.

The total amount of polymerization initiator (viii) present in the ink is preferably 0 to 20 wt %, more preferably 5 to 15 wt %, especially 10 to 13 wt %, relative to the total weight of the ink.

The bisacylphosphine oxide compound is not particularly limited; a known compound may be used, e.g. bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and/or bis(2,6-dimethoxybenzoyl)-2,4,4-trimethylpentylphosphine oxide. The bisacylphosphine oxide compound is preferably bis(2,4,6-trimethylbenzoyl) phenylphosphine oxide (e.g. IRGACURE™ 819 from Ciba Specialty Chemicals) or bis(2,6-dimethoxybenzoyl)-2,4,4-trimethylpentylphenylphosphine oxide.

The optional thioxanthone compounds may comprise substituents, e.g. selected from alkyl (e.g. $C_{1-4}$-alkyl), alkoxy (e.g. $C_{1-4}$-alkoxy) and halo (e.g. chloro) groups.

The preferred optionally substituted thioxanthone is of the Formula (2):

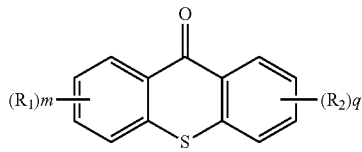

Formula (2)

wherein:
each $R_1$ and each $R_2$ independently is a substituent other than hydrogen;
m has a value of 0, 1, 2, 3 or 4; and
q has a value of 0, 1 or 2.

Each $R_1$ and each $R_2$ independently is preferably $C_{1-4}$-alkyl, $C_{1-4}$-alkoxy or halo (especially chloro). In a particularly preferred embodiment, m has a value of 0, each $R_2$ independently is $C_{1-4}$-alkyl (especially isopropyl) and q has a value of 1 or 2.

Thioxanthones compounds may be prepared by general methods known in the art, for example by the cyclisation of 2-phenylthiobenzoic acid derivatives. The preparation can be performed in one step, e.g. by reacting a 2,2'-dithiodibenzoic acid compound with an aromatic compound in sulphuric acid. Typical of the methods for preparing thioxanthones are those described in U.S. Pat. No. 4,101,558 and US patent application Publication No. 2003229233.

As examples of thioxanthone compounds there may be mentioned thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl) thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsudfurylthioxanthone, 3,4-di-[2-(2-methoxyethoxy) ethoxycarbonyl] thioxanthone, 1-ethoxycarbonyl-3-(1-methyl-1-morpholinoethyl) thioxanthone, 2-methyl-6-dimethoxymethylthioxanthone, 2-methyl-6-(1,1-dimethoxybenzyl) thioxanthone, 2-morpholinomethylthioxanthone, 2-methyl-6-morpholinomethyl thioxanthone, n-allylthioxanthone-3,4-dicarboximide, n-octylthioxanthone-3,4-dicarboximide, N-(1,1,3,3-tetramethylbutyl)thioxanthone-3,4-dicarboximide, 1-phenoxythioxanthone, 6-ethoxycarbonyl-2-methoxythioxanthone, 6-ethoxycarbonyl-2-methylthioxanthone and thioxanthone-2-polyethylene glycol ester and mixtures comprising two or more thereof.

As examples of commercially available thioxanthone compounds there may be mentioned isopropyl thioxanthone (available as Speedcure™ ITX), 2,4-diethyl thioxanthone, 2-t butyl thioxanthone, 2-chlorothioxanthone, 1-chloro-4-propoxythioxanthone (CPTX) and 2-propoxy thioxanthone. Isopropyl thioxanthone is particularly preferred.

The amount of thioxanthone compound in the ink, when present, is preferably 0.4 to 4.5 wt %, more preferably 0.4 to 4 wt %, especially 0.4 to 3 wt %, relative to the total weight of the ink.

The [alpha]-amino ketone and [alpha]-hydroxy ketone compounds are not particularly limited.

Examples of the [alpha]-amino ketone compounds include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)butan-1-one. Furthermore, a commercial product such as IRGACURE 907, IRGACURE 369, or IRGACURE 379 manufactured by Ciba-Geigy Ltd. are preferred.

The amount of [alpha]-amino ketone compounds and [alpha]-hydroxy ketone compounds in the ink, when present, is preferably (respectively) 0.4 to 4.5 wt %, more preferably 0.4 to 4 wt %, especially 0.4 to 3 wt %, relative to the total weight of the ink.

Preferably the radiation-curable ink further comprises (ix) 2-phenoxyethyl (meth)acrylate, especially 2-phenoxyethyl acrylate (PEA). The amount of 2-phenoxyethyl (meth)acrylate present in the ink is preferably 0 to 40 wt %, more preferably 5 to 35 wt %, especially 10 to 30 wt %, relative to the total weight of the ink. PEA has the following structure:

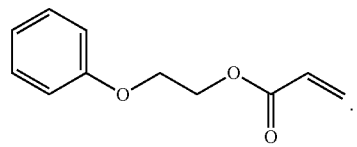

The radiation-curable ink optionally further comprises (x) a passive resin, i.e. a resin which is not radiation-curable. The passive resin is preferably selected from the following list: solid epoxies, ketone resins, acrylate and methacrylate copolymers, vinyl resins, solid polyesters, phenoxy resins and cellulosics. The most preferred passive resins are acrylate and methacrylate copolymers.

The passive resin preferably has a Tg of 30° to 130° C.
Suitable passive resins are described in patent US2010/0272966

Examples of commercially available passive resins include Paraloid™ DM55, Paraloid™ B60, Paraloid™ B66, Laropal™ A81, Elvacite™ 4026, Elvacite™ 2013, Dianal™ BR115, Dianal™ BR113 and Adhesion Resin™ LTH.

The amount of passive resin (x) present in the ink the amount is preferably 0 to 6 wt %, more preferably 0.25 to 6 wt %, especially 1 to 5 wt %, relative to the total weight of the ink.

Optionally the radiation-curable ink further comprises (xi) a surfactant, e.g. an ionic surfactant, a non-ionic surfactant or both an ionic surfactant and a non-ionic surfactant. Preferably the surfactant is a radiation-curable surfactant.

A particularly preferred surfactant is Byk3575. However there are many other commercially available radiation-curable surfactants that can be used, including Byk 3576, Evonik's TegoRad 2100, 2200N, 2250, 2500, 2600, 2700 or 2010, non-radiation-curable BYK306, BYK307, BYK331, BYK333, BYK347, BYK348, and the like (manufactured by BYK Chemie Co., Ltd.), NUC Corporation's Silwet L-7604, Silwet L-706N, Silwet FZ-2104 and Silwet FZ-216, fluorosurfactants (e.g. Dow Chemical Capstone products such as FS22, FS34, FS35, FS65 FS83 or DIC F-4431, F-444, F-445, F-446, F-470, F-471, F-474, F-475, F-477, F-479, F-482, F-483, F-484, F-486, F-172D and F-178K) and other similar materials from other manufacturers.

When a surfactant (xi) is included in the ink the amount is typically 0.01 to 5 wt %, more preferably 0.05 to 3 wt %, relative to the total weight of the ink.

Optionally the radiation-curable ink further comprises (xii) a further compound (i.e. a component which does not fall within any of definitions for components (i) to (xi))

which is free from cyclohexyl groups and cyclopentyl groups has one (i.e. only one) meth(acrylate group) and is not CTFA or PEA. Preferably component (xii) has a NAMW of 1000 or less.

Examples of component (xii) include isodecyl acrylate, tridecyl acrylate and 2-[[(butylamino)carbonyl]oxy]ethyl acrylate.

The amount of component (xii) present in the ink is preferably 0 to 15 wt %, more preferably 0 to 10 wt %, especially 0.1 to 3.5 wt %, more especially 0 to 5 wt %, particularly 0 wt %, relative to the total weight of the ink.

In view of the foregoing, a preferred radiation-curable ink according to the invention (Embodiment A') comprises:
0.1 to 20 wt % of component (i);
5 to 40 wt % of component (ii);
5 to 40 wt % of component (iii);
0 to 5 wt % of component (iv); and
5 to 35 wt % of component (v).

Another preferred radiation-curable ink according to the invention (Embodiment B') comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 5 wt % of component (vi), preferably 0.2 to 2 wt % of component (vi).

Another preferred radiation-curable ink according to the invention ('Embodiment C') comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 6 wt % of component (vii), preferably 0.25 to 6 wt % of component (vii).

Another preferred radiation-curable ink according to the invention ('Embodiment D') comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 20 wt % of component (viii), preferably 10 to 13 wt % of component (viii).

Another preferred radiation-curable ink according to the invention ('Embodiment E') comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 40 wt % of component (ix), preferably 10 to 30 wt % of component (ix).

Another preferred radiation-curable ink according to the invention ('Embodiment F') comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 6 wt % of component (x), preferably 0.5 to 5 wt % of component (x).

Another preferred radiation-curable ink according to the invention (Embodiment G') comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 5 wt % of component (xi), preferably 0.05 to 3 wt % of component (xi).

Preferably Embodiments A and C to G further comprise 0.2 to 1.5 wt % of component (vi).
Preferably Embodiments A, B and D to G further comprise 0.25 to 5 wt % of component (vii).
Preferably Embodiments A to C and E to G further comprise 0.1 to 6 wt % of component (viii).
Preferably Embodiments A to D and F and G further comprise 10 to 35 wt % of component (ix).
Preferably Embodiments A to E and G further comprise 1 to 5 wt % of component (x).
Preferably Embodiments A to F further comprise 0.05 to 3 wt % of component (xi).

Another preferred radiation-curable ink according to the invention (Embodiment H') comprises:
0.1 to 20 wt % of component (i);
5 to 40 wt % of component (ii);
5 to 40 wt % of component (iii);
0 to 5 wt % of component (iv);
5 to 35 wt % of component (v);
0 to 5 wt % of component (vi);
0 to 6 wt % of component (vii);
0 to 20 wt % of component (viii);
0 to 40 wt % of component (ix);
0 to 6 wt % of component (x); and
0 to 5 wt % of component (xi).

Another preferred radiation-curable ink according to the invention (Embodiment I') comprises:
0.5 to 15 wt % of component (i);
8 to 35 wt % of component (ii);
8 to 35 wt % of component (iii);
<1 wt % of component (iv);
5 to 35 wt % of component (v);
0.2 to 2 wt % of component (vi);
0.25 to 6 wt % of component (vii);
10 to 13 wt % of component (viii);
10 to 30 wt % of component (ix);
0.5 to 5 wt % of component (x);
0.05 to 3 wt % of component (xi).

For the avoidance of doubt, the preferences mentioned in the general description of this specification apply equally to Embodiments A to I.

If desired further ingredients may be included in the radiation-curable ink of the present invention, e.g. an antioxidant, a UV stabiliser etc.

When the ink contains an antioxidant, the preferred antioxidant is a sterically hindered tertiary or secondary amine. Examples of such amines include N, N-diphenylamine, N-nitroso-diphenylamine, nitrosodiethylaniline, p-phenylenediamine, an N,N'-di($C_{1-4}$) alkyl-p-phenylenediamine such as N,N'-di-isobutyl-p-phenylenediamine, or N,N'-di-isopropyl-p-phenylenediamine, Irganox™ 5057 (produced by Firma Ciba Spezialitaetenchemie), N-phenyl-p-phenylenediamine, N,N'-diphenyl-p-phenylenediamine, N-isopropyl-N-phenyl-p-phenylenediamine, N,N'-di-s-butyl-p-phenylenediamine (Kerobit™ BPD produced by BASF Aktiengesellschaft), N-phenyl-N'-isopropyl-p-phenylenediamine (Vulkanox™ 4010 produced by Bayer A G), N-(1,3-dimethylbutyl)-N'-phenyl-p-phenylenediamine, N-phenyl-2-naphthylamine, iminodibenzyl, N,N'-diphenylbenzidine, N-phenyltetraaniline, acridone, 3-bydroxydiphenylamine, 4-hydroxydiphenylamine and mixtures comprising two or more thereof.

When an antioxidant is included in the ink the amount is typically 0.01 to 0.25 wt %, relative to the total weight of the ink.

UV stabilizers may be included in the ink to reduce or prevent premature polymerization during the manufacture and storage of the ink. Examples of suitable stabilisers include Additol™ S100, S110 and S120 from Cytec, Florstab™ UV1, UV2, UV3, UV8, UV11 and UV12 from Kromachem; and Tinuvin™ 328, 384, 1130, 400, 123, 292 and 5151 from Ciba and UV-22 from BASF.

When the ink contains a UV stabiliser, the amount present is selected so as not to unduly interfere with the process for radiation curing the ink in normal use. Typically 0.1 to 1 wt % of the UV stabiliser (preferably UV-12) is used, relative to the total weight of the ink.

When the colorant is or comprises a pigment, the ink preferably further comprises a dispersant, especially a dispersant having a weight-average molecular weight of 1,000 or greater.

Examples of suitable dispersants include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580 and EFKA 7731 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), lonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 wt % relative to the weight of the entire ink composition.

Preferably the radiation-curable ink contains less than 5 wt %, more preferably less than 2 wt %, especially less than 0.5 wt % of N-vinyl caprolactam (NVC). It is particularly preferred that the ink is free from NVC.

Preferably the radiation-curable ink contains less than 5 wt %, more preferably less than 2 wt %, especially less than 0.5 wt % of tetrahydrofurfuryl acrylate (THFA). It is particularly preferred that the ink is free from THFA.

Preferably the total number of parts by weight of the abovementioned ink components adds up to 100. When the total number of parts by weight of the components adds up to 100 this does not rule out the presence of further components, it merely serves to define the total amount of components relative to each other.

Preferably the radiation-curable ink contains less than 5 wt %, more preferably less than 2 wt %, especially less than 0.5 wt % of non-curable solvent. It is particularly preferred that the ink is substantially free from non-curable solvent. It can be difficult to ensure that the ink is completely free from non-curable solvent because many of the ingredients used to make radiation-curable inks contain small amounts of non-curable solvent.

Preferably the radiation-curable ink has a viscosity of from 5 to 50 cP, more preferably 10 to 30 cP, when measured at 25° C. One may measure viscosity using Brookfield LVDV1 fitted with a 00 spindle rotating at a speed of 20 rpm.

Preferably the radiation-curable ink has a surface tension of from 20 to 40 mN/m, more preferably 22 to 37 mN/m, when measured at 25° C. One may measure surface tension using a Sigma 702 Automated Torsion Balance.

According to a second aspect of the present invention there is provided a process for printing a substrate comprising applying thereto a radiation-curable ink according to the first aspect of the present invention and curing the ink.

Preferably the ink is applied to the substrate by means of an ink jet printer. The process is particularly useful where the substrate is a flexible substrate.

The curing may be performed using any source of radiation which provides the wavelength and intensity of radiation necessary to cure the ink. Typically the curing is performed using electron beam radiation or ultra violet light, especially using a light emitting diode which emits ultraviolet light (UV-LED).

Preferred substrates include metal, plastic, ceramic, glass, wood and flexible substrates such as papers, plastics sheets, balloons, textiles and apparel.

Printed substrates carrying a cured ink form a further feature of the present invention.

The invention in further illustrated by the following examples in which all parts and percentages are by weight unless otherwise stated.

EXAMPLES

The following abbreviations are used in the Tables below:
Mogul E is a carbon black pigment, available from Cabot.
Heliogen Blue D7110F is a cyan pigment, available from BASF.
TBCHA, TMHCA, IBOA, are as hereinbefore defined.
CTFA and PEA
UV12 is a 30 wt % suspension of an aluminium tris (N-hydroxy-N-nitroso phenylaminato-O—O' salt in phenoxy ethyl acrylate. Therefore 0.32 parts of UV12 consisted of 0.096 parts of an aluminium tris (N-hydroxy-N-nitroso phenylaminato-O—O' salt and 0.224 parts of phenoxy ethyl acrylate having one acrylate group.
CN2560 is a tetrafunctional polyester acrylate, available from Sartomer.
CN964A85 is an aliphatic polyester based urethane diacrylate oligomer blended with 15% SR306, tripropylene glycol diacrylate, obtained from Sartomer.
EFKA 7731 is Efka® PX 4731 a dispersant available from BASF.
Irgacure™ 819, Irgacure™ are photoinitiators.
379 and Irgacure™ 184
ITX is Speedcure™ ITX (isopropyl thioxanthone).
NVC is N-vinyl caprolactam.
CN9012 is a difunctional urethane oligomer, available from Sartomer.
PRO20169 is a urethane acrylate oligomer from Sartomer.
Paraloid DM55 is a passive resin (a 100% solids acrylic resin), available from Dow.
Genomer 5695 is a urethane acrylate oligomer, available from Rahn.
Dianal BR113 is a 100% solids acrylic copolymer resin from Dianal America Inc.

Byk 307 is BYK®-307, a polyether modified polydimethylsiloxane dispersant available from Byk.

Byk 3575 is BYK-UV 3575, a crosslinkable dispersant from Byk.

Example 1 and Comparative Examples 1 and 2 and (Black Inks)

Inks were prepared as follows:

A black millbase was prepared by milling Mogul E (40 parts, black pigment) with PEA (46.5 parts), parts Efka 7731 (12 parts) and Florstab UV-12 (1.5 parts).

The black inks were then prepared by mixing the black millbase (8.5 parts) with the remaining ingredients indicated in Table 1 below. The photoinitiators were incorporated by mixing at 40° C.

TABLE 1

| Component | Raw Material | CEx. 1 Comparison Amount (%) | CEx. 2 Comparison Amount (%) | Example 1 Invention Amount (%) |
|---|---|---|---|---|
| Component (i) | Mogul E | 3.4 | 3.4 | 3.4 |
| Component (ii) | TBCHA | 0 | 0 | 25 |
| Component (iii) | IBOA | 40 | 20 | 15 |
| Component (iv) | NVC | 0 | 0 | 0 |
| Component (v) | CTFA | 20 | 40 | 20 |
| Other | UV-12 | 0.6 | 0.6 | 0.6 |
| Component (vii) | CN2560 | 5 | 5 | 5 |
| Other | CN964A85 | 3 | 3 | 3 |
| Component (viii) | Efka7731 | 1 | 1 | 1 |
| | Irgacure™ 819 | 4 | 4 | 4 |
| | ITX | 4 | 4 | 4 |
| | Irgacure™ 184 | 3 | 3 | 3 |
| | Irgacure 379 | 2 | 2 | 2 |
| Component (ix) | PEA | 14 | 14 | 14 |
| TOTAL | | 100 | 100 | 100 |
| Cure | | Pass | Fail | Pass |
| Adhesion | | Fail | Fail | Pass |

The inks described in Table 1 were applied to PVC, PS, APET using an RK coating machine fitted with a 6 μm wire-wound coating bar.

Each drawdown was cured using a bespoke UV curing unit set at 40 m/min and delivering a dose of 160 mJ/cm² per pass with a peak intensity of 1120 mW cm2.

The resultant, cured prints were then tested and scored as follows:

Cure:

The prints which were fully cured after 3 or less passes through the UV curing unit were scored "Pass". The prints which were not fully cured after the 3 passes were scored "Fail".

Adhesion:

The cross hatch adhesion of the fully cured prints to the various substrates (PVC, PS, APET) was measured as described in ASTM test method D3359-B. Prints where 5% or less was removed were scored "Pass". If >5% was removed the score was "Fail".

Comparative Examples 1 and 2 both have component (ii) missing and comparison example 1C only has a low amount of component (iii)

Discussion of Results:

Comparative Example 1 failed the adhesion test whereas Comparative Example 2 failed both cure and adhesion tests. In contrast, Inventive Example 1 passed both tests. In conclusion component (ii) is required in the inks of the invention.

Examples 2 and 3 and Comparative Example 3 (Cyan Inks)

A cyan millbase was prepared by milling Heliogen Blue D7110F (30 parts, ex-BASF) in PEA (59 parts), Solsperse™ 32000 (10 parts) and Florstab UV-12 (1 part).

A passive resin solution was prepared by mixing Paraloid DM55 (35 parts), PEA (64 parts) and Florstab UV-12 (1 part) by stirring at high speed at 50° C.

Inks were then prepared by mixing the cyan millbase, passive resin solution and other ingredients as indicated in Table 2 below. The photoinitiators were added with mixing at 40° C.

TABLE 2

| Component | Raw Material | CEx. 3 Comparison Amount (%) | Example 2 Invention Amount (%) | Example 3 Invention Amount (%) |
|---|---|---|---|---|
| Component (i) | Heliogen Blue D7110F | 2.60 | 2.60 | 2.60 |
| Component (ii) | TMCHA | 0 | 30.00 | 0 |
| | TBCHA | 0 | 0 | 30.00 |
| Component (iii) | IBOA | 17.00 | 17.00 | 17.00 |
| | DCPA | 30.00 | 0 | 0 |
| Component (iv) | NVC | 0 | 0 | 0 |
| Component (v) | CTFA | 17.00 | 17.00 | 17.00 |
| Component (vii) | PRO20169 | 5.00 | 5.00 | 5.00 |
| Component (viii) | Irgacure™ 819 | 4.00 | 4.00 | 4.00 |
| | Irgacure™ 184 | 3.00 | 3.00 | 3.00 |
| | Irgacure™ 379 | 2.00 | 2.00 | 2.00 |
| | ITX | 0.80 | 0.80 | 0.80 |
| | Benzophenone | 2.00 | 2.00 | 2.00 |
| Component (ix) | PEA | 13.50 | 13.50 | 13.50 |
| Component (x) | Paraloid DM55 | 1.75 | 1.75 | 1.75 |
| | UV-12 | 0.50 | 0.50 | 0.50 |
| | Solsperse™ 32000 | 0.85 | 0.85 | 0.85 |
| TOTAL | | 100.00 | 100.00 | 100.00 |
| Cure | | PASS | PASS | PASS |
| Adhesion | | FAIL | PASS | PASS |

The inks were tested as described above, except that the RK coating machine was fitted with a 12 μm (instead of 6 μm) wire-wound coating bar.

Comparative Example 3 is missing component (ii) whereas inventive Examples 2 and 3 comprise component (ii).

Comparative Example 3 failed the adhesion test. In contrast, inventive Examples 2 and 3 passed both cure and adhesion tests to give an overall satisfactory result.

In conclusion, component (ii) is required in the inks of the invention.

Example 4 and Comparative Examples 4 and 5 (Cyan Inks)

Cyan millbases and inks were prepared and tested for cure as described above for Examples 2 and 3 and Comparative Example 2. The resultant inks and the cure results are described in Table 3 below:

TABLE 3

| Component | Raw Material | CEx. 4 Comparison Amount (%) | CEx. 5 Comparison Amount (%) | Example 4 Invention Amount (%) |
|---|---|---|---|---|
| Component (i) | Heliogen Blue D7110F | 2.60 | 2.60 | 2.60 |
| Component (ii) | TMCHA | 12.50 | 20.00 | 12.50 |
| | TCBHA | 12.50 | 20.00 | 12.50 |
| Component (iii) | IBOA | 0 | 0 | 25.00 |
| Component (iv) | NVC | 0 | 0 | 0 |
| Component (v) | CTFA | 30.00 | 18.20 | 18.20 |
| Component (vii) | CN9012 | 5.00 | 5.00 | 5.00 |
| Component (viii) | Irgacure™ 819 | 4.00 | 4.00 | 4.00 |
| | Irgacure™ 184 | 3.00 | 3.00 | 3.00 |
| | Irgacure™ 379 | 2.00 | 2.00 | 2.00 |
| | ITX | 0.80 | 0.80 | 0.80 |
| | Benzophenone | 2.00 | 2.00 | 2.00 |
| Component (ix) | PEA | 23.10 | 19.90 | 9.90 |
| Component (x) | Dianal BR113 | 1.20 | 1.20 | 1.20 |
| Other | Solsperse™ 32000 | 0.80 | 0.80 | 0.80 |
| | UV-12 | 0.50 | 0.50 | 0.50 |
| | TOTAL | 100.00 | 100.00 | 100.00 |
| | Cure | PASS | PASS | PASS |
| | Wallace Rub Test | FAIL | FAIL | PASS |

The Wallace rub test was performed using a Wallace rub tester. This indicated the rub/abrasion resistance of the cured inks. The Wallace rub tester comprised a rotating head holding a circular piece of Avery SAV which is applied to the sample under a defined load and number of revolutions The rub or abrasion resistance is determined by the extent of damage to the cured ink or by the extent of colour or print transfer to the piece of corrugated paper board. The scores were rated 1 to 5, where 5 is no damage (i.e. good abrasion/rub resistance) and 1 is substantial poor damage (i.e. very poor abrasion/rub resistance). A score of less than 4 was a Fail.

Comparative Examples 4 and 5 comprise component (ii) but component (iii) is absent.

Inventive Example 4 comprises all of components (i), (ii), (iii) and (iv).

Both of Comparative Examples 4 and 5 failed both the Wallace Rub test. In contrast, Inventive Example 4 passed both the cure test and the Wallace Rub Test.

In conclusion, component (iii) is required in the inks of the invention.

Examples 5 and 6 and Comparative Example 6 (Cyan Inks)

Cyan millbases and inks were prepared and tested for cure as described above for Examples 2 and 3 and Comparative Example 2.

The resultant inks and the cure results are described in Table 4 below:

TABLE 4

| Component | Raw Material | CEx. 6 Comparison Amount (%) | Example 5 Invention Amount (%) | Example 6 Invention Amount (%) |
|---|---|---|---|---|
| Component (i) | Heliogen Blue D7110F | 2.50 | 2.60 | 2.60 |
| Component (ii) | TMCHA | 0 | 13.00 | 14.00 |
| | TBCHA | 0 | 12.50 | 0 |
| Component (iii) | IBOA | 11.90 | 17.50 | 17.50 |
| | DCPA | 0 | 0 | 12.50 |
| Component (iv) | NVC | 16.50 | 0 | 0 |
| Component (v) | CTFA | 22.90 | 17.50 | 17.50 |
| Component (vii) | CN9012 | 0 | 5.00 | 4.00 |
| | Genomer 5695 | 2.00 | 0 | 0 |
| Component (viii) | Irgacure™ 819 | 2.00 | 4.00 | 4.00 |
| | Irgacure™ 184 | 2.85 | 3.00 | 3.00 |
| | Irgacure™ 379 | 0 | 2.00 | 2.00 |
| | ITX | 0 | 0.80 | 0.80 |
| | Benzophenone | 0 | 2.00 | 2.00 |
| | TPO | 2.00 | 0 | 0 |
| Component (ix) | PEA | 32.55 | 16.70 | 16.70 |
| Component (x) | Dianal BR113 | 2.50 | 1.00 | 1.00 |
| Other | UV-12 | 0.50 | 0.55 | 0.55 |
| | Solsperse™ 32000 | 0.80 | 0.85 | 0.85 |
| | Byk307 | 1.00 | 0 | 0 |
| | Byk 3575 | 0 | 1.00 | 1.00 |
| | TOTAL | 100.00 | 100.00 | 100.00 |
| | Cure | PASS | PASS | PASS |
| | Adhesion | PASS | PASS | PASS |
| | Mar Resistance | PASS | PASS | PASS |
| | Embrittlement | FAIL | PASS | PASS |

In order to perform the tests described in Table 4 above, the inks described in Table 4 were first printed onto substrates using an Accuity Advance HS 3545 UV inkjet printer and cured using Lamp 7. This provided samples of printed substrate carrying cured ink for assessment.

The substrate in the Cure test referred to in Table 4 was PVC and two sheets were printed using Quality and FineArt print modes respectively. The cure test was performed by rubbing the printed PVC with a finger. If prints in both modes were tack-free the cure was scored Pass, whereas a tacky print in either or both modes was scored Fail.

The substrates in the Adhesion test referred to in Table 4 were PVC, PS, PET, Acrylic, PC and Coroplast (PC). Seven sheets were printed with ink using Quality mode. The adhesion of the printed substrates was evaluated as described above in Examples 1 and 2.

The substrate in the Mar Resistance test referred to in Table 4 was Avery SAV and one sheet was printed with ink using Quality mode. The Mar Resistance test referred is an abrasion resistance test. Each of the samples of printed substrate was secured on the reciprocatable table of a Taber™ Reciprocating Abraser Model 5900 such that the path defined by contact with the looped stylus along the platform stroke length could be accommodated over a clean, clear area of print. A 2N weight was attached to the Taber™ test arm above the looped stylus and the number of reciprocating cycles was set to 5. After the completion of 5 cycles, the path made by the looped stylus on each sample was examined for damage and scored Pass or Fail.

The Embrittlement test referred to in Table 4 was performed as follows. Each ink was printed onto three, A4 sheets of white PVC of (22 μm thickness) as described above, using FineArt mode. After 24 hours, each print was rolled lengthways into a cylinder and struck three times against the top edge of a shelf. Each print was then assessed for any splitting of the print and scored Pass (no splitting) or Fail (visible splitting).

Component (ii) is missing from Comparative Example 6 and NVC is also present in an amount of >5 wt %. In contrast, inventive Examples 5 and 6 both contained component (ii) and were free from NVC.

Comparative Example 6 failed the embrittlement test. In contrast, Inventive Examples 2 and 6 both passed both the embrittlement test.

In conclusion, component (ii) is required in the inks of the invention and the inks of the invention passed the cure, adhesion and mar resistance test (in addition to the embrittlement test) even though they did not contain any NVC.

Example 7 and Comparative Examples 7 and 8 (Magenta Inks)

A magenta millbase was prepared by milling Cinquasia™ Magenta L4540 (30 parts magenta pigment) with PEA (56.5 parts), Solsperse™ 32000 (12 parts) and Florstab™ UV-12 (1.5 parts). Magenta inks were then prepared by mixing the magenta millbase (15 parts) with the remaining ingredients necessary to obtain the formulations described in Table 5 below. The photoinitiators were incorporated by mixing with the other components at 40° C.

TABLE 5

| Component | Raw Material | CEx. 7 Comparison Amount (%) | CEx. 8 Comparison Amount (%) | Example 7 Invention Amount (%) |
|---|---|---|---|---|
| Component (i) | Cinquasia Magenta L4540 | 5 | 5 | 5 |
| Component (ii) | TMCHA | 22 | 40 | 16 |
| Component (iii) | IBOA | 22 | 0 | 16 |
| | DCPA | 20 | 0 | 14 |
| Component (iv) | NVC | 0 | 0 | 0 |
| Component (v) | CTFA | 0 | 25 | 20 |
| Component (vii) | CN9012 | 2 | 2 | 2 |
| Component (viii) | Irgacure™ 819 | 3 | 3 | 3 |
| | ITX | 1 | 1 | 1 |
| | Esacure™ KIP160 | 4 | 4 | 4 |
| | Speedcure™ EDB | 2 | 2 | 2 |
| Component (ix) | PEA | 15 | 15 | 15 |
| Component (x) | Dianal™ BR113 | 1 | 1 | 1 |
| Other | UV-12 | 1 | 1 | 1 |
| | Solsperse™ 32000 | 2 | 2 | 2 |
| | Byk™ 3575 | 1 | 1 | 1 |
| | TOTAL | 100 | 100 | 100 |
| | Cure | Fail | Pass | Pass |
| | Fingernail scratch | Fail | Fail | Pass |
| | Film tack | Fail | Fail | Pass |

The inks described in Table 5 were applied to Avery Self-adhesive Vinyl using a RK coating machine fitted with a 12 μm wire-wound coating bar. Each drawdown was cured using a bespoke UV curing unit set at 40 m/min and output set at 850 W (100 W/cm) and consisted of three layers; the first two layers were cured with 1 pass and the third layer was cured with three passes. The resultant, cured prints were then tested and scored as follows:

The fingernail scratch test was performed by scratching across the cured print with a fingernail. Prints that did not show damage were scored "Pass". Prints that showed damage were scored "Fail".

The film tack test was performed as follows: 24 hours after curing, a finger was pressed onto the print. Prints that showed no tack were scored "Pass", prints that had tack were scored "Fail".

The cure was also assessed and rated pass or fail.

Comparative Example 7 is missing Component (v). Comparative Example 8 is missing Component (iii).

The invention claimed is:

1. A radiation-curable ink comprising:
   (i) a colorant;
   (ii) a cyclohexyl acrylate of the Formula (1):

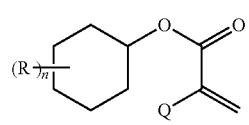

Formula (1)

wherein:
   each R independently is $C_{1-4}$-alkyl;
   n has a value of 1, 2 or 3; and
   Q is H or $CH_3$;
   (iii) a monoacrylate which comprises a cyclohexyl and/or cyclopentyl ring;
   (iv) 0 to 5 wt % of N-vinyl caprolactam;
   (v) cyclic trimethylolpropane formal acrylate;
   (vi) a compound having a number average molecular weight of up to 1000 and more than one ethylenically unsaturated group;
   (vii) an acrylate oligomer having a number average molecular weight greater than 1000;
   (viii) a photoinitiator;
   (ix) 2-phenoxyethyl acrylate; and
   (x) optionally a passive resin.

2. The ink according to claim 1 which is free from N-vinyl caprolactam.

3. The ink according to claim 1 wherein component (ii) comprises t-butylcyclohexyl acrylate and/or trimethyl cyclohexyl acrylate.

4. The ink according to claim 1 which comprises at least 10 wt % of component (ii) and at least 10 wt % of component (iii).

5. The ink according to claim 1 which further comprises one or more of the following ingredients:
   (x) a passive resin; and
   (xi) a surfactant.

6. The ink according to claim 1 which is free from tetrahydrofurfuryl acrylate.

7. The ink according to claim 1 wherein component (iii) comprises isobornyl acrylate and/or dihydrodicyclopentadienyl acrylate.

8. The ink according to claim 1 which comprises:
   0.1 to 20 wt % of component (i);
   5 to 40 wt % of component (ii);
   5 to 40 wt % of component (iii);

0 to 5 wt % of component (iv); and
5 to 35 wt % of component (v).

9. The ink according to claim 1 which comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 5 wt % of component (vi) a compound having a number average molecular weight of up to 1000 and more than one ethylenically unsaturated group.

10. The ink according to claim 9 which comprises 0.2 to 2 wt % of component (vi).

11. The ink according to claim 1 which comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 6 wt % of component (vii) an acrylate oligomer having a number average molecular weight greater than 1000.

12. The ink according to claim 11 which comprises 0.25 to 6 wt % of component (vii).

13. The ink according to claim 1 which comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 20 wt % of component (viii) a photoinitiator.

14. The ink according to claim 13 which comprises 10 to 13 wt % of component (viii).

15. The ink according to claim 1 which comprises:
0.1 to 20 wt % of component (i);
5 to 40 wt % of component (ii);
5 to 40 wt % of component (iii);
0 to 5 wt % of component (iv);
5 to 35 wt % of component (v); and
0 to 40 wt % of component (ix) 2-phenoxyethyl acrylate.

16. The ink according to claim 1 which comprises:
(i) 0.1 to 20 wt % of a colorant;
(ii) 5 to 40 wt % of a cyclohexyl acrylate of the Formula (1):

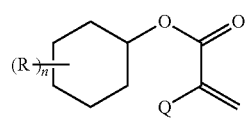

Formula (1)

wherein:
each R independently is $C_{1-4}$-alkyl;
n has a value of 1, 2 or 3; and
Q is H or $CH_3$;
(iii) 5 to 40 wt % of a monoacrylate other than component (ii) which comprises a cyclohexyl and/or cyclopentyl ring;
(iv) 0 to 5 wt % of N-vinyl caprolactam;
(v) 5 to 35 wt % of cyclic trimethylolpropane formal acrylate;
(vi) 0 to 5 wt % of a compound having more than one ethylenically unsaturated group;
(vii) 0 to 10 wt % of acrylate oligomer;
(viii) 0 to 20 wt % of a polymerisation initiator;
(ix) 0 to 40 wt % of 2-phenoxyethyl acrylate;
(x) 0 to 6 wt % of a passive resin; and
(xi) 0 to 5 wt % of a surfactant.

17. The ink according to claim 16 which comprises:
0.5 to 15 wt % of component (i);
8 to 35 wt % of component (ii);
8 to 35 wt % of component (iii);
<1 wt % of component (iv);
5 to 35 wt % of component (v);
0.2 to 2 wt % of component (vi);
0.25 to 6 wt % of component (vii);
10 to 13 wt % of component (viii);
10 to 30 wt % of component (ix);
0.5 to 5 wt % of component (x); and
0.05 to 3 wt % of component (xi).

18. The ink according to claim 1 having a viscosity of 5 to 50 cP when measured at 25° C.

19. The ink according to claim 1 having a surface tension of 20 to 40 mN/m, when measured at 25° C.

20. A process for printing a substrate comprising ink jet printing a radiation-curable ink onto the substrate and curing the ink, wherein the radiation-curable ink is as defined in claim 1.

21. The process according to claim 20 wherein the radiation-curable ink comprises:
(i) 0.5 to 15 wt % of a colorant;
(ii) 8 to 35 wt % of a cyclohexyl acrylate of the Formula (1):

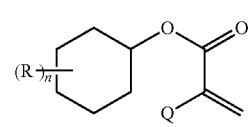

Formula (1)

wherein:
each R independently is $C_{1-4}$-alkyl;
n has a value of 1, 2 or 3; and
Q is H or $CH_3$;
(iii) 8 to 35 wt % of a monoacrylate other than component (ii) which comprises a cyclohexyl and/or cyclopentyl ring;
(iv) less than 1 wt % of N-vinyl caprolactam;
(v) 5 to 35 wt % of cyclic trimethylolpropane formal acrylate;
(vi) 0.2 to 2 wt % of a compound having more than one ethylenically unsaturated group;
(vii) 0.25 to 6 wt % of acrylate oligomer;
(viii) 10 to 13 wt % of a polymerisation initiator;
(ix) 10 to 30 wt % of 2-phenoxyethyl acrylate;
(x) 0.5 to 5 wt % of a passive resin; and
(xi) 0.05 to 3 wt % of a surfactant.

* * * * *